Figure 1:
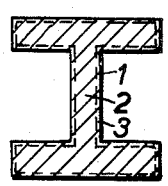

Oct. 7, 1958 P. HOPPE 2,855,021
PROCESS FOR PRODUCING PLATES, SHELLS AND SHAPED ELEMENTS
Filed May 20, 1955

INVENTOR.
PETER HOPPE
BY Elmer P. Rucker
ATTORNEY

2,855,021

PROCESS FOR PRODUCING PLATES, SHELLS AND SHAPED ELEMENTS

Peter Hoppe, Troisdorf, Germany, assignor to Farbenfabriken Bayer Aktiengesellschaft, Leverkusen, Germany, a corporation of Germany Application May 20, 1955, Serial No. 509,982
In Germany October 1, 1948

Public Law 619, August 23, 1954
Patent expires October 1, 1968

3 Claims. (Cl. 154—41)

The invention relates to plates, shells and shaped elements which consist of combinations of thin-walled covering materials, such as metal, wood or plastics, and supporting materials. A large number of materials having widely varying compositions can be used as covering and supporting materials. For producing covering and supporting layers useful for the construction of composite light-weight elements according to the invention, the material can be adapted to the particular purpose for which the plates, shells and shaped elements are to be used, and especially to the mechanical stresses which the articles made by the process of the invention are to withstand.

Besides steel, light metal and wood (plywood), compressed fibrous materials containing a plastic may be used as covering layers according to the invention. In order to obtain covering layers of compressed fibrous materials containing a synthetic resin of high impact strength the proportion of the synthetic binder is to be kept as low as possible, for instance about 10 to about 20% by weight if soda paper fibres are used as supporting material. Covering layers consisting of fibres of all kinds, which contain a polyurethane as binder, are highly valuable. Especially the use of glass fibres (30–40%) in combination with a polyurethane have proved to be very advantageous. These polyurethane covering layers are produced by molding at a pressure of, for instance 2–15 kg./cm.$^2$. Polyvinylchloride plastics are also useful as covering layers.

It is likewise possible to use covering layers of different other materials or combinations of other materials, for instance steel or light metal with plywood or compressed materials, which combinations are bonded with the aid of bonding agents. Synthetic bonding agents, preferably those based on polyurethane resins, are particularly suitable for this purpose.

Felts or mats consisting, for example, of wood fibres, rush fibres, peat fibres, heather fibres or straw fibres can be used as supporting materials. These felts or mats can be obtained from water-containing pulps by removing the water by filtering the pulp with suction on a screen or by spraying the pulp on to a screen plate and drying the resulting fibre fleece in air or at elevated temperature, if desired also under pressure. The fibre strips can be wholly or partially reinforced by means of binding agents. Such fibre strips have a bulk density of 200 to 1000 kg. per cubic metre, depending on their composition.

The supporting material can alternatively consist of materials produced with the aid of synthetic binders from wood, peat or straw shavings or other shavings which are formed as waste, these materials being dried in air or pressed while hot and having a bulk density of 600 to 100 kg. per cubic metre.

If foamable binders, for instance foamable mixtures of polyesters and isocyanates are used as the said synthetic binders, the supporting material can be made without the application of heat and external pressure since the foaming capacity resulting from the water content of the mixture of binder and fibrous material is sufficient to fill up given cavities, while in all other cases the application of external pressure and preferably heat is required to produce supporting material from mixtures of fibrous or waste products and non-foamable binders.

The supporting materials can further consist of foamable masses obtained by condensation or polymerisation, which masses have a bulk density of 100 to 400 kg. per cubic metre and are mixed with fibrous, powdered or chipped additives consisting of vegetable or ceramic waste products, such as, for example, wood, coal, straw, peat, rushes, slags, slag wool or glass wool.

It is especially advantageous for economic reasons to produce supporting materials by introducing foamable mixtures by trowelling, spraying or casting, into the hollow space formed by the covering layers, or by placing foamable crude sheets (for instance of rubber) or pouring foamable cores (for instance of polystyrene) into the hollow space.

If the construction of composite light-weight elements is desired within a short time, it is preferred to use foamable mixtures to fill the cavities formed by covering layers, which thereafter serve as supporting layers rather than use non-foamed materials which require binding to the covering layers. Furthermore, it is desirable to carry out the foaming process at normal temperature. Also for this reason, it is preferred to use a foamable mixture of hydroxyl polyesters and diisocyanates since such mixture allows the reaction to be carried out at room temperature.

Furthermore the use of polyurethane foams ensures an excellent adhesion to covering layers of all kinds.

It is possible to admix fillers of fibres, chipped or powdery material with foamed polyurethane products. Thus, for instance, shavings of wood, straw, peat, finely ground activated carbon, finely ground slag wool or glass wool or glass fibres or finely pulverized metallic fillers may be used as additives. The strength properties of the foamed polyurethane products are improved by the addition of especially fibrous or metallic fillers. Furthermore, the stability to changes in temperature of the foamed polyurethane products is increased by the incorporation of metallic fillers. In general, the strength properties of foamed polyurethane products are not improved by atfer-heating and, therefore, the entire manufacturing process is preferably carried out at room temperature.

In order to improve the adhesion of the foamed polyurethane products to the covering layers the inside surfaces of the covering layers forming the cavity can be pre-coated with suitable binders, preferably those based on polyurethane resins.

Plates, shells and shaped elements consisting of combination of supporting and covering materials as indicated above by way of example possess a series of important advantages as compared with those which consist merely of wood, metal of synthetic resin. A very important advantage is that they are much lighter when of the same shape, dimensions or construction, since the thin layers of covering material are supported by light materials in the constructions of the invention, thereby avoiding the danger of buckling, which is critical with thin-walled covering layers. The elements of the invention require only about two-thirds of the weight of metal as compared with known plates made from wood, metal or plastic.

A further advantage is that the supporting materials, which themselves have a high supporting strength, also provide insulation against cold, heat and sound.

Plates and other shaped elements consisting of the combinations of this invention can be so designed and constructed that they are equal to all mechanical stresses. For example, large wall thickness have a high resistance to bending, despite the small amount of material used. The combination of materials of this invention enables shaped elements to be manufactured in which the moment of inertia for the x-axis ($=Ix$) is equal to that for the y-axis ($=Iy$). This is important, because the most favourable static values, i. e. maximum strength with minimum weight, are obtained with elements in which $Ix=Iy$.

Structural elements subjected to a mechanical stress increasing throughout the said element consist of covering materials, the thickness of which corresponds to the increasing stresses, and of supporting materials corresponding in thickness and in bulk density to the said stresses. The bulk density of the supporting material can be increased to correspond to the increasing stress by being locally, superficially or completely impregnated or by being compressed; the covering and supporting materials can consist of the same or different materials, according to circumstances.

In order to absorb locally strong forces, the covering layers are strengthened by locally gluing or welding bars thereon. The supporting material can be locally strengthened by impregnation or compression or can be replaced by fillers made of metal, wood, plastic or other materials which have a higher strength than the supporting material.

By using combinations of supporting materials of different bulk densities which decrease from the covering material up to the center or the core position of the element (neutral axis or neutral plane), the strength obtained decreases throughout the cross-section of the said component and constitutes the best solution, from a static point of view, for the stresses which actually occur.

The higher bulk densities of the marginal zones towards the covering layer can be obtained by spraying on foamable mixtures and then filling the cavity formed with foamed products of lower bulk density.

Composite structural units of asymmetrical construction, for instance an element of foamed products, which is covered only on one side may receive any desired contour by appropriately molding and after heating.

One substantial advantage of the elements in accordance with the invention is that their manufacture does not require any heavy mechanical equipment, since readily deformable and preferably metallic materials can be used as the covering material and casting, trowelling and spraying processes can be used as well as gluing for bonding the covering materials to the supporting materials.

The method of constructing composite lightweight material elements in accordance with the invention is suitable for the production of flat or curved plates or shell-shaped structural elements with the covering material applied to one or both sides of the supporting material, such as, for example, for house, carriage and automobile doors, for all types of furniture, such as beds, cupboards, tables, chairs, chests of drawers, for girders in building construction, for shells, ceilings and roofing, for stairs, steps and landings, for vehicle bodies, including their fittings, for carriages, for refrigerators, for wheels of all types, for radio cabinets, switch panels and other large equipment, for skis and other sports equipment, for domestic appliances of all types, for lamps and picture frames, for signboards, and for boats.

Figure 2:
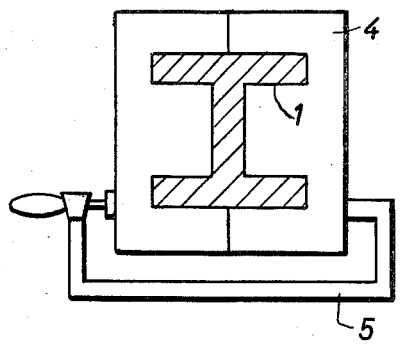

Fig. 1 shows a composite light-weight construction, which can be used for instance as roof beam. The hollow frame 1 formed by covering layers made of light metal, steel or plastic is filled up with the foamed supporting layer 2. The adhesion of the foamed product on the covering layer is increased by applying a pre-coat 3 to the covering layer. Since, for instance roof beams have comparatively large cross-sectional surfaces the frame consisting of thin-walled covering layers must be supported by suitable supporting devices during the foaming process in order to compensate the internal pressure. As can be seen in Fig. 2 the two-part support 4 is placed about the covering frame 1 and held together by means of clamps 5.

Figure 3:
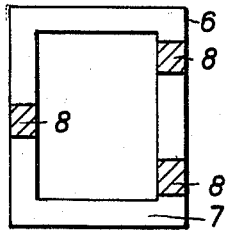

Fig. 3 shows a window frame. The foamable mixture is introduced into the cavity formed by the covering layer 6. Local reinforcing parts adapted for instance to additionally support door locks and hinges are obtained by inserting foamed elements 8 having a higher bulk density into the cavity wherein the core 7 is to be produced. The foaming mixture can be filled into the hollow space through an orifice.

Figure 4:
Figure 4A:
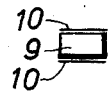

Fig. 4 shows a ski made of a foamed product covered on top and bottom by covering layers of plywood or compressed materials (a vertical section is shown in Fig. 4a). The core 9 is combined with the covering layers 10 by bonding. For taking up the forces from the tie of the ski, foamed products having a higher bulk density or wood 11 are employed for local reinforcement. The manufacturing process can be simplified by preparing the skis from plates from which the individual ski is worked out in an appropriate shape.

Figure 5:
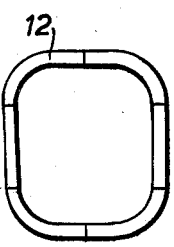

Fig. 5 represents shells which may find application for instance in the construction of carriage parts. Since the foaming process cannot be carried out all over the entire hollow space the shell is divided into individual sections. The shell 12 is a hollow section formed by covering layers and is to be filled with a foamable mixture. The single sections of the shell are combined by riveting, screw coupling or welding as far as the covering layers are of metal.

The following examples illustrate some methods of producing cores of light-weight material according to the invention, the parts given being by weight. It is to be understood, however, that the invention is by no means limited to the specific methods described in the examples.

*Example 1*

A foamed polyurethane product serving as supporting layer having a bulk density of 150 kg./m.$^3$ is produced from:

80 parts of a polyester prepared by thermal condensation of 2.5 mols of adipic acid, 0.5 mol of phthalic acid, 4 mols of trimethylol propane; 20 parts of a polyester prepared by thermal condensation of 3 mols of adipic acid, 2 mols of hexanetriol and 2 mols of butylene glycol, 10 parts of activated charcoal which has a water content of 10% and 60 parts of toluylene diisocyanate.

The components are homogeneously mixed with the aid of stirrers and injected into the cavity formed by covering layers. The foaming process is accomplished without the supply of heat.

*Example 2*

A plate of foamed polyurethane prepared as described in Example 1, is combined with an appropriately shaped covering layer by means of a binder having the following composition:

50 parts of a 75% ethyl acetate solution of a polyester prepared from 3 mols of adipic acid, 4 mols of hexane triol by thermal condensation at 150–220° C., and 50 parts of a 75% ethyl acetate solution of a condensation product prepared from 3 mols of toluylene diisocyanate, 1 mol of trimethylol propane, obtained by two hours' heating to 150° C. The covering layer and the core are coated with the binder, the coated parts are left standing for about 30 minutes so that the solvent evaporates and the parts are then united.

*Example 3*

The hot molding of foamed polyurethane elements coated on one side, which is carried out to obtain curved structural units is accomplished by producing a foamed product as follows:

100 parts of a polyester prepared by thermal condensation of 3 mols of adipic acid, 2 mols of hexanetriol and 2 mols of butylene glycol; 10 parts of activated charcoal having a water content of 10% and 50 parts of toluylene diisocyanate are homogenized and foamed so as to obtain blocks.

Appropriately shaped plates of the desired wall thickness are cut off from the blocks by means of band saws. The plates thus obtained are bonded to the covering layer as described in Example 2. The composite structural plate is then subjected to a temperature of 150° C., removed from the furnace and shaped in the cold.

What is claimed is:

1. A process for producing composite articles comprising in combination a supporting material and a thin-walled covering material, which process comprises coating the inner walls of a cavity defined by said covering material with a foamable mixture yielding a solid polyurethane foam of comparatively high bulk density, and filling the remaining space with a polyurethane foam of comparatively low bulk density to thereby obtain a composite article, the bulk density of which decreases in the direction from the surface to the center.

2. A process for producing plates, shells and shaped elements which comprises applying a binder to a covering material, said binder comprising an hydroxyl polyester and a polyisocyanate, applying a foamable mixture comprising an hydroxyl polyester and a polyisocyanate to said covering material provided with said binder, and allowing said foamable mixture to form a solid polyurethane foam.

3. A process for producing plates, shells and shaped elements which comprises applying a binder to a covering material, said binder comprising an hydroxyl polyester and a polyisocyanate, and applying to said covering material provided with said binder a solid polyurethane foam in the form of a prefabricated element.

References Cited in the file of this patent
UNITED STATES PATENTS 2,576,073    Kropa et al. _____ Nov. 20, 1951

OTHER REFERENCES

"Polyurethanes," by Dr. O. Bayer, published February 28, 1946, by H. M. Stationery Office at London, England, (twenty pages). Pages of interest 8, 11 and 13 to 16.

"German Plastics Practice," by De Bell, Goggin, and Gloor, published with permission of the Dept. of Commerce by De Bell and Richardson (Springfield, Mass.) 1946 (see Chapter XXI, pp. 463–465).

"Foamed Plastics," by Goggin et al., published in British Plastics; December 1947; pp. 528–36.